United States Patent
Peterson

(10) Patent No.: US 8,019,521 B2
(45) Date of Patent: Sep. 13, 2011

(54) ENHANCED THROTTLE CONTROL

(75) Inventor: Gregory E. Peterson, Sylvan Lake, MI (US)

(73) Assignee: Chrysler Group LLC, Auburn Hills, MI (US)

(*) Notice: Subject to any disclaimer, the term of this patent is extended or adjusted under 35 U.S.C. 154(b) by 321 days.

(21) Appl. No.: 11/687,105

(22) Filed: Mar. 16, 2007

(65) Prior Publication Data
US 2007/0244619 A1    Oct. 18, 2007

Related U.S. Application Data

(60) Provisional application No. 60/782,948, filed on Mar. 16, 2006.

(51) Int. Cl.
*G06F 19/00* (2006.01)
(52) U.S. Cl. .......... 701/70; 701/85; 701/37; 701/38
(58) Field of Classification Search .......... 701/36–38, 701/48, 82–85, 91, 94, 70
See application file for complete search history.

(56) References Cited

U.S. PATENT DOCUMENTS

| | | | |
|---|---|---|---|
| 4,361,060 A | 11/1982 | Smyth | |
| 4,453,516 A | 6/1984 | Filsinger | |
| 4,470,396 A | 9/1984 | Hasumi et al. | |
| 4,472,777 A | 9/1984 | Youngblood | |
| 4,656,986 A | 4/1987 | Kull et al. | |
| 4,792,901 A | 12/1988 | Mack et al. | |
| 4,811,713 A | 3/1989 | Shimada et al. | |
| 4,866,625 A * | 9/1989 | Kawamoto et al. | 701/89 |
| 4,881,428 A | 11/1989 | Ishikawa et al. | |
| 4,962,570 A | 10/1990 | Hosaka et al. | |
| 5,033,002 A * | 7/1991 | Sol | 701/90 |
| 5,163,530 A | 11/1992 | Nakamura et al. | |
| 5,222,570 A | 6/1993 | Kawamura et al. | |
| 5,278,761 A * | 1/1994 | Ander et al. | 701/84 |
| 5,282,137 A * | 1/1994 | Suzuki et al. | 701/85 |
| 5,383,431 A | 1/1995 | Nishimura et al. | |
| 5,391,127 A | 2/1995 | Nishimura | |
| 5,471,386 A | 11/1995 | Hrovat et al. | |
| 5,517,414 A * | 5/1996 | Hrovat | 701/91 |
| 5,642,708 A | 7/1997 | Heinrich et al. | |
| 5,869,943 A * | 2/1999 | Nakashima et al. | 318/586 |

(Continued)

FOREIGN PATENT DOCUMENTS

DE    41 42 498 A1    6/1993
(Continued)

OTHER PUBLICATIONS

SAE Review, vol. 19, No. 1, "Powertrain Control by DBW System—Strategy and Modeling," Yoshiaki Darino, Kazuhide Togal, Toyoaki Fukui and Makota Shimade, pp. 85-98 (Feb. 1, 1989).

(Continued)

*Primary Examiner* — Mark Hellner
*Assistant Examiner* — Helal A Algahaim
(74) *Attorney, Agent, or Firm* — Ralph E. Smith

(57) ABSTRACT

A throttle control system for a vehicle includes a suspension sensor that detects suspension amplitudes of a suspension system of the vehicle, a grade sensor that detects an angular position of the vehicle, and a controller that receives first operational data from the suspension sensor and second operational data from the grade sensor and regulates a throttle of the vehicle based on the first and second operational data.

15 Claims, 2 Drawing Sheets

U.S. PATENT DOCUMENTS

| | | | |
|---|---|---|---|
| 6,044,318 A | 3/2000 | Bourdon et al. | |
| 6,434,469 B1 * | 8/2002 | Shimizu et al. | 701/84 |
| 6,591,178 B2 * | 7/2003 | Krueger et al. | 701/83 |
| 6,769,399 B2 | 8/2004 | Darnell | |
| 6,889,132 B2 | 5/2005 | Bidner et al. | |

FOREIGN PATENT DOCUMENTS

| | | |
|---|---|---|
| EP | 0 322 790 A2 | 5/1989 |
| EP | 0 647 773 A2 | 12/1995 |
| EP | 0 548 533 B1 | 11/1996 |
| GB | 2 154 763 A | 11/1985 |
| GB | 2 265 994 A | 10/1993 |
| GB | 2 273 580 A | 6/1994 |
| GB | 2 277 610 A | 11/1994 |
| WO | WO 97/12773 | 10/1997 |

OTHER PUBLICATIONS

SAE 930939, "Electronic Throttle Control as an Emission Reduction Device," R. J. Tudor, Lotus Engineering, pp. 173-186 (Mar. 1, 1993).

* cited by examiner

ENHANCED THROTTLE CONTROL

CROSS-REFERENCE TO RELATED APPLICATIONS

This application claims the benefit of U.S. Provisional Application No. 60/782,948, filed on Mar. 16, 2006. The disclosure of the above application is incorporated herein by reference.

STATEMENT REGARDING FEDERALLY SPONSORED RESEARCH OR DEVELOPMENT

This invention was made with Government support under contract number DAAE 07-03-3L001 issued by the Department of Defense. The government has certain rights in this invention.

FIELD OF THE INVENTION

The present invention relates to throttle control systems, and more particularly, to an improved throttle control system for use in vehicles that travel in inclement weather and/or over uneven terrains.

BACKGROUND OF THE INVENTION

Vehicle with off-road capability such as sport utility vehicles and trucks are becoming increasingly popular for their ability to handle inclement weather conditions and uneven terrain while still providing a comfortable ride on a paved road surface. When such vehicles are traveling during dry conditions and over a normal road surface, such as a concrete or asphalt road, the vehicle is typically configured to almost instantaneously respond when an accelerator is depressed. Conversely, when the vehicle is traveling in inclement weather conditions and/or over uneven terrain, the responsiveness of the vehicle is somewhat reduced to better control operation of the vehicle.

Conventional torque control systems have relied on power reduction to a vehicle engine through spark retardation and/or fuel reduction to the vehicle engine to reduce the speed of the vehicle during inclement weather and/or during travel over uneven road surfaces. While control systems adequately slow the vehicle during operation in inclement weather and/or over uneven road surfaces, such control systems are typically difficult to modulate and, as a result, may cause a rough and/or "jerky" ride. Because such conventional throttle control systems may yield an uncomfortable ride, increased brake wear and higher fuel consumption are also typical byproducts of the conventional throttle control system, as an operator of the vehicle often attempts to lessen the effects of such a control system during operation by pumping the brakes and/or sharply accelerating.

Therefore, while conventional torque control systems adequately slow a vehicle when traveling in inclement weather conditions and/or during travel over uneven road surfaces, conventional torque control systems suffer from the disadvantage of being difficult to modulate and therefore result in increased brake wear, higher fuel consumption, and a generally uncomfortable ride.

SUMMARY OF THE INVENTION

A throttle control system for a vehicle is provided and includes a suspension sensor that detects suspension amplitudes of a suspension system of the vehicle, a grade sensor that detects an angular position of the vehicle, and a controller that receives first operational data from the suspension sensor and second operational data from the grade sensor and regulates a throttle of the vehicle based on the first and second operational data.

In another configuration, a throttle control system for a vehicle includes a traction-control system that selectively controls a speed of the vehicle by applying a force to at least one of a plurality of wheels of the vehicle at a predetermined duty cycle and a controller in communication with the traction-control system that controls a throttle of the vehicle based on the duty cycle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
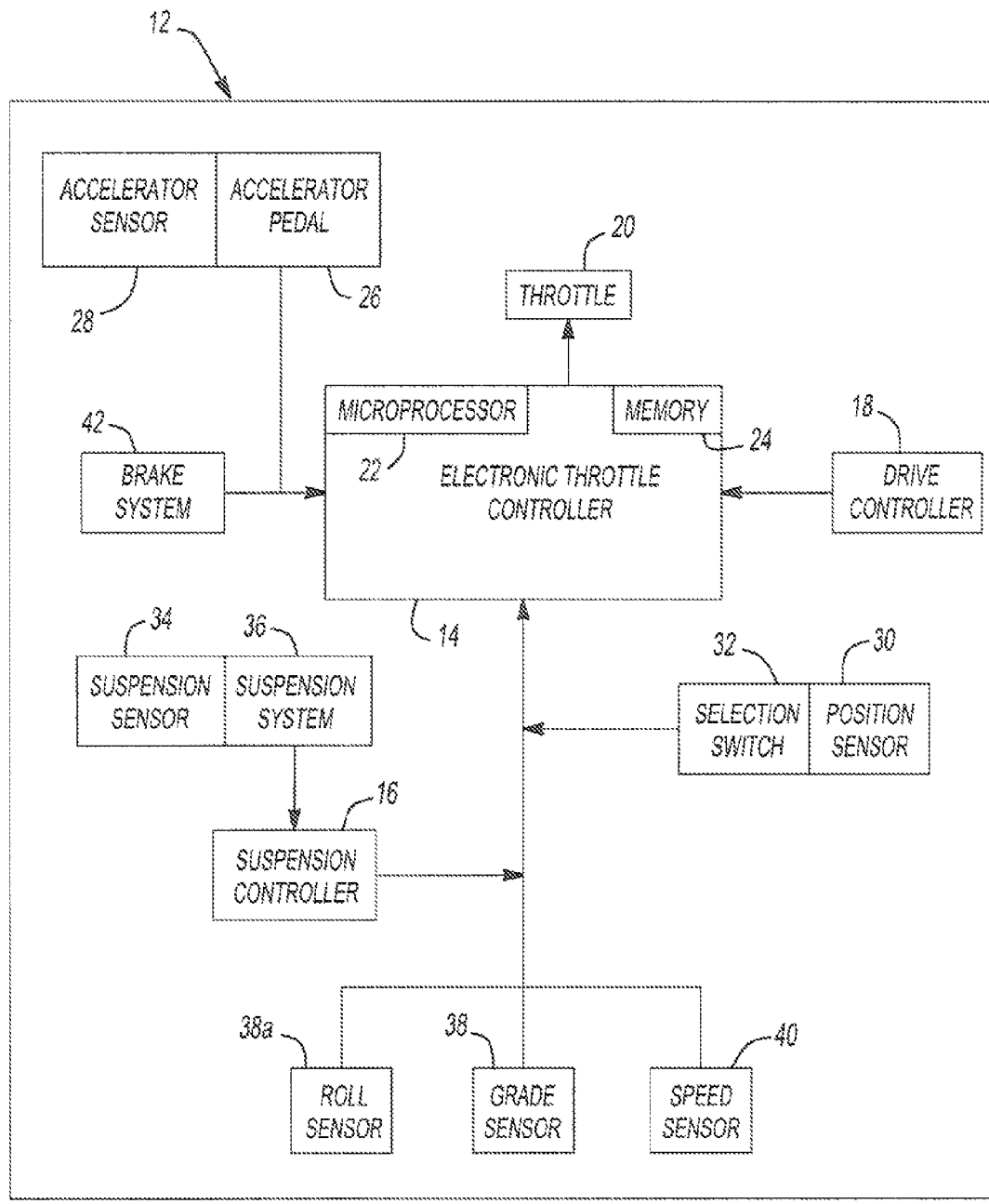
FIG. 1 is a schematic representation of a throttle control system in accordance with the present invention.
Figure 2:
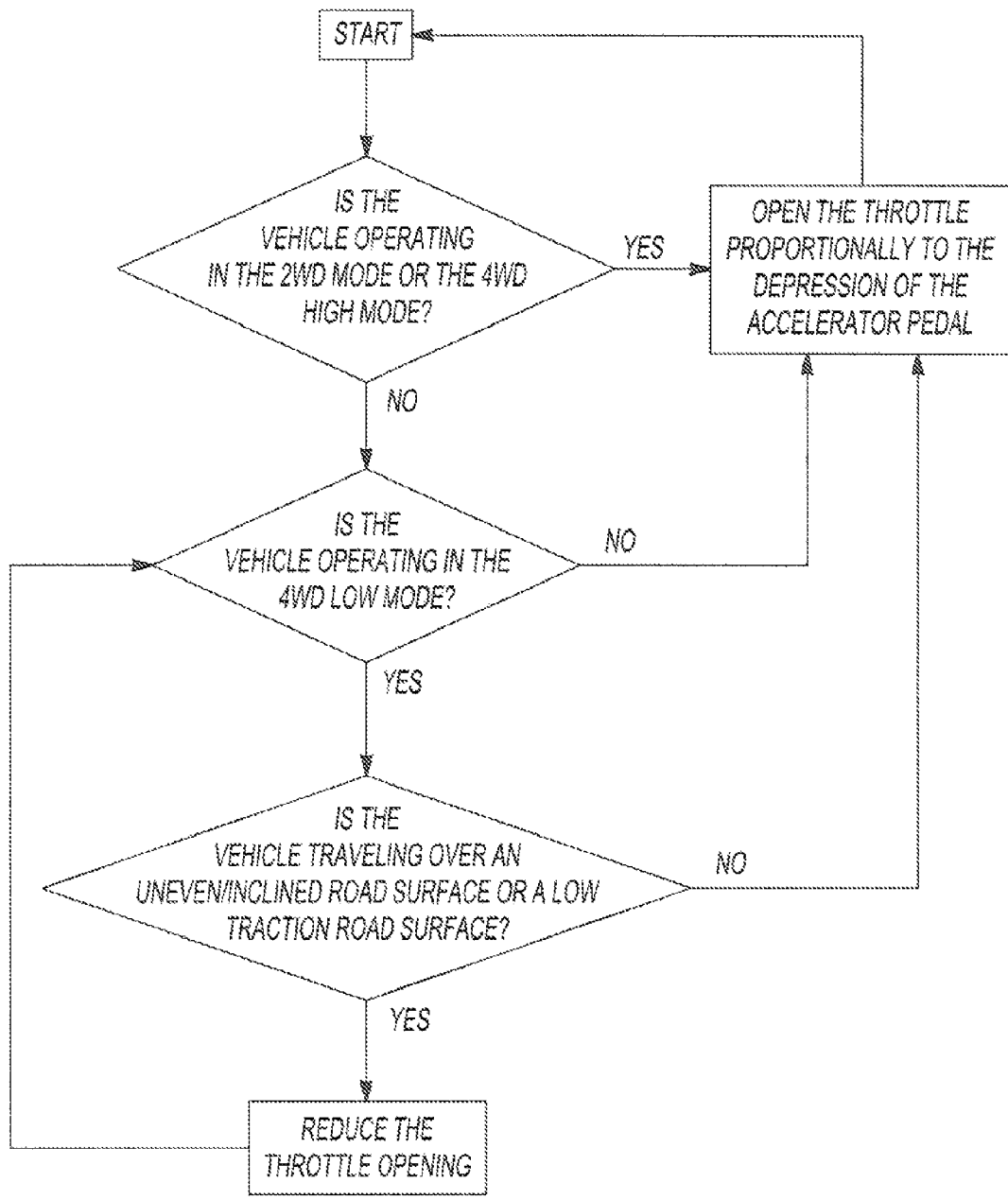
FIG. 2 is a flowchart detailing operation of the throttle control system of FIG. 1.

The following description of the preferred embodiment(s) is merely exemplary in nature and is in now way intended to limit the invention, its application, or uses.

With reference to the figures, a throttle control system 10 for a vehicle 12 is provided and includes a electronic throttle controller 14, a suspension controller 16, and a driver controller 18. The electronic throttle controller 14, suspension controller 16, and drive controller 18 cooperate to regulate a throttle 20 associated with the vehicle 12 based on driving conditions.

The electronic throttle controller 14 preferably includes a microprocessor 22 for executing stored programs and a memory 24 for storing programs and other vehicle performance data. The electronic throttle controller 14 regulates an opening of the throttle 20 based on inputs from a driver of the vehicle 12, from the suspension controller 16, and from the drive controller 18.

For example, in one exemplary embodiment, when acceleration is desired, the driver of the vehicle 12 applies a force to an accelerator pedal 26, thereby depressing the accelerator pedal 26 and sending a signal to the electronic throttle controller 14 via an accelerator sensor 28. The accelerator sensor 28 detects the degree to which the accelerator pedal 26 is depressed (i.e., the travel of the accelerator pedal 26) and provides a signal to the electronic throttle controller 14 indicative of the desired acceleration.

Upon receipt of the signal from the accelerator sensor 28, the electronic throttle controller 14 first determines an operating mode of the vehicle 12. In one exemplary embodiment, the electronic throttle controller 14 may interrogate the drive controller 18 to determine whether the vehicle 12 is operating in a two-wheel drive mode, a four-wheel drive high mode, or a four-wheel drive low mode.

The drive controller 18 is able to quickly detect the operating mode of the vehicle 12 by interrogating a position sensor 30 associated with a selection switch 32. The position sensor 30 is able to determine the position of the selection switch 32 and provide a signal to the drive controller 18 indicative of the operating mode of the vehicle 12 (i.e., two-wheel drive mode, four-wheel drive high mode, or four-wheel drive low mode). Once the signal is received by the drive controller 18 from the position sensor 30, the drive controller 18 supplies the operating mode of the vehicle 12 to the electronic throttle controller 14. The electronic throttle controller 14, upon receipt of the operating mode of the vehicle 12, controls the throttle 20 based on the operating mode of the vehicle 12, as well as input from the suspension controller 16.

The suspension controller 16 is in communication with at least one suspension sensor 34 that detects suspension amplitudes of a suspension system 36 of the vehicle 12. Generally speaking, large suspension amplitudes are typically caused by the vehicle 12 traveling over uneven road conditions such as deep ruts and/or boulders located in the path of the vehicle. When the vehicle 12 travels over such uneven road conditions, the suspension sensor 34 detects articulation of the suspension system 36 and reports such articulation of the suspension system 36 to the suspension controller 16.

The suspension controller 16 receives information regarding performance of the suspension system 36 and thus, the road over which the vehicle 12 is traveling, based on the information received from the suspension sensor 34. The suspension controller 16 may provide either raw sensor data from the suspension sensor 34 or processed sensor data to the electronic throttle controller 14 for use by the electronic throttle controller 14 in reacting to the depression of the accelerator pedal 26.

Once the electronic throttle controller 14 has received information from the drive controller 18 regarding the operating mode of the vehicle 12 as well as the road conditions over which the vehicle 12 is traveling from the suspension controller 16, the electronic throttle controller 14 may adjust the throttle 20 according to the amount the accelerator pedal 26 is depressed.

If the drive controller 18 indicates that the vehicle 12 is operating in either the two-wheel drive or the four-wheel drive high mode, the electronic throttle controller 14 will open the throttle 20 in accordance wit the depression of the accelerator pedal 26. In other words, the electronic throttle controller 14 will control the throttle 20 to provide the requested acceleration based on the travel of the accelerator pedal 26.

If the electronic throttle controller receives information from the drive controller 18 that the vehicles 12 is in the four-wheel drive low mode, the electronic throttle controller 14 then determines the road conditions over which the vehicle 12 is traveling. If the suspension controller 16 indicates to the electronic throttle controller 14 that the vehicle 12 is traveling over a smooth surface, the electronic throttle controller 14 will control the throttle 20 such that the requested acceleration is provided.

If the electronic throttle controller 14 receives information from the drive controller 18 that the vehicle 12 is in the four-wheel drive low mode and receives information from the suspension controller 16 that the vehicle 12 is traveling over uneven road conditions, the electronic controller 14 will react to the demand for acceleration, but will not provide the requested acceleration. Rather, the electronic throttle controller 14 will restrict opening of the throttle 20 to improve throttle control based on the input from the suspension controller 16 and the drive controller 18.

By way of example, the electronic throttle controller 14 may automatically change scale from zero to eighty-five percent wide open throttle to zero to twenty-five percent wide open throttle for the same travel of the accelerator pedal 26. In other words, when the accelerator pedal 26 is depressed an amount "X" a throttle opening under normal driving conditions may be approximately eighty-five percent wide open throttle. However, when the vehicle 12 is opening in the four-wheel drive low mode and the is traveling in inclement weather conditions and/or over uneven road surfaces, depressing the accelerator pedal 26 the amount "X" only results in a throttle opening of twenty-five percent wide open throttle. Restricting opening of the throttle 20 during such driving conditions reduces the speed of the vehicle 12 and improves engine speed modulation and vehicle speed control.

Therefore, when the accelerator pedal 26 is depressed, and the electronic throttle controller 14 receives information from the suspension controller 16 that the vehicle 12 is traveling in inclement weather conditions and/or over uneven road surfaces and receives information from the drive controller 18 that the vehicle 12 is operating in the four-wheel drive low mode, the electronic throttle controller 14 reduces the acceleration of the vehicle 12 by reducing the amount the throttle 20 is permitted to open.

For example, if a driver of the vehicle 12 depresses the accelerator pedal 26 approximately fifty percent of the total travel of the accelerator pedal 26 under normal driving conditions when the vehicle 12 is in either the two-wheel drive mode or the four-wheel drive high mode, the electronic throttle controller 14 may open the throttle 20 to substantially fifty percent wide open throttle. However, when the vehicle 12 is traveling in inclement weather conditions and/or over uneven road surfaces and is operating the four-wheel drive low mode, the electronic throttle controller 14 will reduce the throttle opening when the accelerator pedal 26 is depressed the same distance (i.e., a distance approximately equal to fifty percent of the total travel of the accelerator pedal 26). The electronic throttle controller 14 may reduce the throttle opening to somewhere between ten and twenty-five percent wide-open throttle to improve throttle control under such driving conditions.

As described above, the electronic throttle controller 14, in cooperation with the suspension controller 16 and drive controller 18, allows for responsive operation of the vehicle 12 during normal driving conditions. When the accelerator pedal 16 is depressed, and the vehicle 12 is operating on normal road conditions and in one of the two-wheel drive mode or the four-wheel drive high mode, the throttle 20 is proportionally opened based on the travel of the accelerator pedal 26. However, when the vehicle 12 is traveling in inclement weather conditions and/or over uneven conditions, cooperation between the electronic throttle controller 14, suspension controller 16, and drive controller 18 restricts the throttle opening when the accelerator pedal 26 is depressed. Therefore, when driving conditions are undesirable, the electronic throttle controller 14 is able to regulate the throttle 20 even when the accelerator pedal 26 is depressed.

The throttle control system 10 may include a grade sensor 38 and a roll sensor 38a in addition to, or in place of, the suspension controller 16. The grade sensor 38 detects the grade on which the vehicle 12 may be traveling based on an angular position of the vehicle 12 while the roll sensor 38a detects a tilt of the vehicle (i.e. cross-car tilt). As such, the grade sensor 38 and roll sensor 38a are able to provide the electronic throttle controller 14 with a signal indicative of whether the vehicle 12 is traveling on an inclined/tilted surface or a flat surface. Information received from the grade sensor 38 and roll sensor 38a may be used by the electronic throttle controller 14 to ascertain whether or not to restrict the opening of the throttle 20 to control operation of the vehicle 12 based on an angle of the surface over which the vehicle is traveling. While the throttle control system 10 may only include grade sensor 38, the throttle control system 10 will hereinafter be described as including both a grade sensor 38 and a roll sensor 38*a*.

If the grade sensor 38 and roll sensor 38*a* are used in conjunction with the suspension controller 16, the suspension controller 16 provides the electronic throttle controller 14 with a signal indicative of the suspension amplitude of the suspension system 36 via suspension sensor 34, while the grade sensor 38 and roll sensor 38*a* provide the electronic throttle controller 14 with a signal indicative of the angular position of the vehicle 12 (i.e., whether the vehicle is on a flat surface, an inclined surface, or a tilted surface).

In operation, the electronic throttle controller 14 interrogates the drive controller 18 to determine the operating mode of the vehicle 12. Specifically, the electronic throttle controller 14 determines whether the vehicle 12 is operating in the two-wheel drive mode, the four-wheel drive high mode, or the four-wheel drive low-mode. Once the electronic throttle controller 14 determines the operating mode of the vehicle 12, the electronic throttle controller 14 then interrogates the grade sensor 38 and roll sensor 38*a* to determine whether the vehicle 12 is operating on a flat road surface or an inclined surface or a tilted surface.

If the electronic throttle controller 14 receives a signal from the drive controller 18 that the vehicle 12 is operating in one of the two-wheel drive mode or the four-wheel drive high mode, the electronic throttle controller 14 allows the throttle 20 to be proportionally opened based on the travel of the accelerator pedal 26. However, if the electronic throttle controller 14 receives information from the drive controller 18 that the vehicle 12 is operating in the four-wheel drive low mode, the electronic throttle controller 14 interrogates the grade sensor 38 and the roll sensor 38*a* to determine whether the vehicle 12 is traveling over a flat road surface or an inclined surface, or a tilted road surface.

If the electronic throttle controller 14 receives information from the grade sensor 38 and the roll sensor 38*a* that the vehicle 12 is traveling over a flat road condition, the electronic throttle controller 14 allows the throttle 20 to be proportionally opened based on the travel of the accelerator pedal 26. However, if the electronic throttle controller 14 receives information from the grade sensor 38 and the roll sensor 38*a* that the vehicle 12 is traveling over an inclined and/or tilted surface, the electronic throttle controller 14 may regulate the opening of the throttle 20 to adjust the performance of the vehicle 12. Specifically, if the electronic throttle controller 14 determines that the vehicle 12 is traveling on an angled surface based on information received from the grade sensor 38 and/or the roll sensor 38*a* the electronic throttle controller 14 may restrict the throttle opening when the accelerator pedal 26 is depressed.

For example, if the accelerator pedal 26 is depressed under normal driving conditions to a distance approximately equal to fifty percent of its total travel, the throttle 20 is proportionally opened to roughly fifty percent of its wide open throttle position. However, if the electronic throttle controller 14 determines that the operating mode of the vehicle is the four-wheel drive low mode and the vehicle is at, or above, a predetermined angle based on information received from the grade sensor 38 and/or the roll sensor 38*a* the electronic throttle controller 14 may reduce the opening of the throttle 20 to somewhere between ten and thirty percent wide open throttle even if the accelerator pedal 26 is depressed a distance roughly equal to fifty percent of its total travel.

By restricting opening of the throttle 20 based on information received from the drive controller 18, the grade sensor 38, and the roll sensor 38*a*, the electronic throttle controller 14 is able to control operation of the vehicle 12 when the vehicle 12 is operating on an inclined and/or titled surface that exceeds a predetermined acceptable angle. The electronic throttle controller 14 is able to ascertain the inclination and tilt of the surface over which the vehicle 12 is traveling based on information received from the grade sensor 38 and the roll sensor 38*a*. Therefore, the electronic throttle controller 14 cooperates with the drive controller 18, the grade sensor 38, and the roll sensor 38*a*, to control opening of the throttle 20 when the accelerator pedal 26 is depressed.

If the throttle control system 10 includes the suspension controller 16, the grade sensor 38, and the roll sensor 38*a*, the electronic throttle controller 14 is able to control operation of the throttle 20 and, thus, the vehicle 12, based on information received from the suspension controller 16, drive controller 18, the grade sensor 38, and the roll sensor 38.

In operation, if the electronic throttle controller 14 receives information from the drive controller 18 that the operating mode of the vehicle is one of the two-wheel drive mode or the four-wheel drive high mode, the electronic throttle controller 14 will proportionally open the throttle 20 based on a travel of the accelerator pedal 26. However, if the electronic throttle controller 14 receives information from the drive controller 18 that the vehicle 12 is operating in the four-wheel drive low mode, the electronic throttle controller 14 will interrogate the suspension controller 16, the grade sensor 38, and the roll sensor 38*a* to determine the terrain over which the vehicle 12 is traveling.

The electronic throttle controller 14 may restrict opening of the throttle 20 if either of the suspension controller 16, the grade sensor 38, or the roll sensor 38*a* provides information to the electronic throttle controller 14 that the vehicle 12 is traveling over rough terrain (i.e., uneven road and/or an inclined and/or titled surface). Alternatively, the electronic throttle controller 14 may restrict opening of the throttle 20 only when each of or a combination of the suspension controller 16, the grade sensor 38, and the roll sensor 38*a* provide information to the electronic throttle controller 14 that the vehicle 12 is traveling over rough road conditions.

In one configuration, the electronic controller 14 must receive information from each of the suspension controller 16, the grade sensor 38, and the roll sensor 38*a* that the vehicle is traveling over rough road conditions prior to restricting throttle opening. Specifically, the electronic throttle controller 14 must receive information from the suspension controller 16 that the vehicle 12 is traveling over an uneven road surface, as determined by the suspension sensor 34 associated with the suspension system 36. In addition, the electronic throttle controller 14 must also receive information from the grade sensor 38 and the roll sensor 38*a* that the vehicle 12 is traveling on an inclined and tilted surface that exceeds a predetermined angle. If the electronic throttle controller 14 receives information from the suspension controller 16 that the vehicle 12 is operating over an uneven road, and receives information from the grade sensor 38 and the roll sensor 38*a* that the vehicle 12 is traveling on an inclined or tilted road that exceeds a predetermined angle, the electronic throttle controller 14 will restrict opening of the throttle 20 when the accelerator pedal 26 is depressed.

In another configuration, the electronic throttle controller 14 will restrict opening of the throttle 20 when the accelerator pedal 26 is depressed if information is received from either the suspension controller 16, the grade sensor 38, or the roll sensor 38*a* that the vehicle 12 is traveling over rough road conditions (i.e., uneven, inclined or tilted). For example, if the drive controller 18 indicates that the vehicle 12 is operating in the four-wheel drive low mode, and the suspension controller 16 indicates that the vehicle 12 is traveling over uneven road conditions, the electronic throttle controller 14 will restrict opening of the throttle 20 when the accelerator pedal 26 is depressed without regard to the inclination or tilt of the road over which the vehicle 12 may be traveling.

If the suspension controller 16 indicates that the vehicle 12 is traveling over a relatively smooth road, but the grade sensor 38 and/or roll sensor 38a indicates that the vehicle 12 is traveling on an inclined and/or tilted road that exceeds a predetermined angle, in conjunction with information from the drive controller 18 that the vehicle 12 is operating in the four-wheel drive low mode, the electronic throttle controller 14 will restrict opening of the throttle 20 when the accelerator pedal 26 is depressed.

While the electronic throttle controller 14 has been described above as interrogating the suspension controller 16 prior to interrogation of the grade sensor 38 and the roll sensor 38a it would be understood that the electronic throttle 14, once receiving information from the drive controller 18 that the vehicle 12 is operating in the four-wheel drive low mode, may simultaneously interrogate each of the suspension controller 16, the grade sensor 38, and the roll sensor 38a. If any or all of the suspension controller 16, the grade sensor 38, and the roll sensor 38a provide information to the throttle controller 14 that the vehicle 12 is traveling over rough road conditions (i.e., uneven road conditions and/or inclined road surface), the electronic throttle controller 14 will restrict opening of the throttle 20 when the accelerator pedal 26 is depressed.

The throttle control system 10 has thus far been described as being associated with a drive controller 18. The drive controller 18 utilizes the position sensor 30 to determine the position of the selection switch 32 to provide the electronic throttle controller 14 with the operating mode of the vehicle 12 (i.e., two-wheel drive mode, four-wheel drive high mode, or four-wheel drive low mode). Therefore, as described, the drive controller 18 essentially utilizes a position sensor 30 for use with a manual selection switch 32. In addition to such manual operation, the drive controller 13 may also be configured to automatically control operation of the throttle 20 and thus, operation of the vehicle 12, regardless of the position of the selection switch 32 when the vehicle 12 is traveling in low traction conditions such as in ice or snow.

When the vehicle 12 is traveling over a low-traction road surface, such as when the road surface is covered with ice, snow, and/or mud, friction between driving wheels of the vehicle 12 and the road surface is reduced, thereby inhibiting the ability of the driving wheels to grasp the road surface and propel the vehicle 12. Such conditions may be sensed by using a speed sensor 40 associated with a non-driving wheel of the vehicle 12 that provides the electronic throttle controller 14 and/or drive controller 18 with a signal indicative of the rotational speed of the non-driving wheel. Because the drive controller 18 is in communication with the electronic throttle controller 14, the drive controller 18 is able to interrogate the electronic throttle controller 14 and receive information from the electronic throttle controller 14 as to the speed at which the vehicle 12 should be traveling based on the position of the accelerator pedal 26 received from the accelerator sensor 28. Because the drive controller 18 knows the speed at which the vehicle 12 should be traveling based on the position of the accelerator pedal 26 received from the electronic throttle controller 14, the drive controller 18 is able to compare the speed at which the vehicle 12 should be traveling with the rotational speed of the non-driving wheels, as detected by the speed sensor 40.

If the drive controller 18 determines that the driving wheel is rotating at a higher rotational speed than would normally be associated with travel of the vehicle 12 at the speed received from the electronic throttle controller 14, the drive controller 18 may override the position of the selection switch 32 and change the operation of the vehicle 12 from either the two-wheel drive mode or the four-wheel drive high mode to the four-wheel drive low mode.

Once the drive controller 18 changes the operating mode of the vehicle 12 into the four-wheel drive low mode, the electronic throttle controller 14 is able to control the opening of the throttle 20, as described above. Specifically, because the drive controller 18 is now indicating to the electronic throttle controller 14 that the vehicle 12 is operating in the four-wheel drive low mode, the electronic throttle controller 14 is able to control opening of the throttle 20 based on information received from at least one of the suspension controller 16, the grade sensor 38, and the roll sensor 38a.

As described above, if the electronic controller 14 receives information from the drive controller 18 that the vehicle 12 is operating in the four-wheel drive low mode, and at least one of the suspension controller 16, the grade sensor 38, and the roll sensor 38a indicates to the electronic throttle controller 14 that the vehicle 12 is traveling over rough road conditions (i.e., uneven road surfaces and/or inclined/tilted road surfaces), the electronic throttle controller 14 will restrict opening of the throttle 20 when the accelerator pedal 26 is depressed.

The drive controller 18 may change the operating mode of the vehicle 12 once the drive controller 18 receives information from the speed sensor that the driving wheel is rotating at a speed commensurate with the desired speed of the vehicle, as received from the electronic throttle controller 14. When the speed sensor 40 indicates that the driving wheel is traveling at the appropriate speed, the drive controller 18 is able to determine that the vehicle 12 is traveling over normal road conditions and that the friction between the driving wheels of the vehicle 12 and the road are adequate to propel the vehicle 12 at the desired speed.

Once the operating mode of the vehicle 12 has been changed by the drive controller 18 from the four-wheel drive low mode to one of the two-wheel drive mode or the four-wheel drive high mode, the electronic throttle controller 14 once again permits the throttle 20 to be proportionally controlled base on the position of the accelerator pedal 26, as detected by the accelerator sensor 28. At this point, the drive controller 18 once again determines the operating mode of the vehicle 12 based on a position of the selection switch 32 and will revert to the operating mode of the vehicle 12 as indicated by the selection switch 32.

In addition to the foregoing, the throttle control system 10 may also be used to reduce the sensitivity of the throttle 20 as a function of a duty cycle of a traction control system when the vehicle 12 is operating in either the two-wheel drive mode, the four-wheel drive high mode, or the four-wheel drive low mode. Specifically, the throttle control system 10 may reduce the opening of the throttle 20 when the accelerator pedal 26 is depressed when an actual speed of the vehicle 12 is less than a predetermined speed and the traction control duty cycle exceeds a predetermined value.

As described above, a speed sensor 40 may be associated with a non-driving wheel to provide the drive controller 18 with information regarding the rotational speed of the non-driving wheel. The speed sensor 40 may also, or alternatively, be linked to the electronic throttle controller 14 to provide the electronic throttle controller 14 with similar information. If the electronic throttle 14 is coupled to the speed sensor 40, such that the electronic throttle controller 14 receives information regarding rotational speed of a non-driving wheel, the electronic throttle controller 14 is able to control the opening of the throttle 20 based on the actual speed of the vehicle 12 coupled with information regarding the duty cycle of the traction control system.

The traction control system may be a brake system 42 that selectively applies a braking force to the wheels of the vehicle 12. The brake system 42 is preferably an anti-lock brake system that supplies a series of pulsations to the brakes of the vehicle 12 to stop the vehicle 12 when traveling in low-traction conditions such as ice, snow, and/or mud. The pulsations are applied to the brakes of the vehicle 12 at a predetermined duty cycle and may be proportionally related to the road conditions over which the vehicle 12 is traveling.

In operation road conditions may be determined through information received from the speed sensor 40. For example, as rotation of the driving wheels increasingly exceeds a desired rotation of the driving wheels, the brake system 42 is able to determine that the road conditions are increasingly worse. As the road conditions become increasingly worse, such that friction between the driving wheels of the vehicle 12 and the road surface are increasingly diminished, the brake system 42 may increase the frequency of the pulsations applied to the wheels of the vehicle 12 in an effort to stop the vehicle 12. The electronic throttle controller 14 may be provided with the frequency of the pulsations from the brake system 42, which may be used by the electronic throttle controller 14 as an indicator of the specific road conditions over which the vehicle 12 is traveling.

The electronic throttle controller 14 is able to compare the speed of the non-driving wheels (based on information received from the speed sensor 40) to the traction control duty cycle (i.e. frequency of pulsation) for use in controlling the opening of the throttle 20 when the accelerator pedal 26 is depressed. Generally speaking, the electronic throttle controller 14 will restrict opening of the throttle 20 when the accelerator pedal 26 is depressed if the actual vehicle speed as measured by the speed sensor 40 is less than a predetermined speed, and the traction control duty cycle, as received from the brake system 42, exceeds a predetermined level.

For example, if the electronic throttle controller 14 receives information from the speed sensor 40 that the actual vehicle speed is less than seven miles per hour and receives information from the brake system 42 that the traction control duty cycle exceeds seventy-five percent, the electronic throttle controller 14 will restrict opening of the throttle 20 from sixty percent wide open throttle to ten percent wide open throttle for the same accelerator pedal travel. By restricting opening of the throttle 20 when the accelerator pedal 26 is depressed, the electronic throttle controller 14 is able to work in conjunction with the brake system 42 to slow the vehicle 12 when traveling over low-traction road conditions.

When the electronic throttle controller 14 receives information from the brake system 42 that the traction control duty cycle is approaching zero percent, the electronic throttle controller 14 returns to normal operation, thereby allowing the throttle 20 to be proportionally open when the accelerator pedal 26 is depressed. While the throttle control system 10 is described as being able to reduce throttle sensitivity as a function of the traction control duty cycle when the vehicle 12 is operating in any of the above-described operating modes (i.e. two-wheel drive mode, four-wheel drive high mode, and four-wheel drive low mode), the control system 10 may be alternatively configured such that the electronic throttle controller 14 only controls operation of the throttle 20 as a function of the traction control duty cycle when the vehicle 12 is operating in only one of the above-mentioned operating modes.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A throttle control system for a vehicle, the throttle control system comprising:
    a suspension sensor operable to detect suspension amplitudes of a suspension system of the vehicle;
    a grade sensor operable to detect an angular position of the vehicle;
    a selection switch operable to set an operating mode of the vehicle to one of a first operating mode and a second operating mode, wherein said first operating mode is a four-wheel drive low mode and said second operating mode is one of a two-wheel drive mode and a four-wheel drive high mode; and
    a controller receiving first operational data from said suspension sensor, second operational data from said grade sensor, and said operating mode of the vehicle, said controller determining if the vehicle is operating in said first operating mode or said second operating mode;
    said controller controlling a throttle opening of the vehicle proportional to a position of an accelerator based on determining that the vehicle is operating in said second operating mode; and
    said controller determing if said first or second operational data is beyond a predetermined threshold based on determining that the vehicle is operating in said first operating mode, and said controller then controlling said throttle opening to reduce said throttle opening to an amount less than proportional to said position of said accelerator based on said first operational data and said second operational data in response to determining that said first or second operational data is beyond the predetermined threshold and only after determining said vehicle Is operating in said first operating mode.

2. The throttle control system of claim 1, further comprising a speed sensor associated with a non-driven wheel of the vehicle.

3. The throttle control system of claim 2, wherein said speed sensor provides a signal to said controller indicative of a speed of said non-driven wheel.

4. The throttle control system of claim 3, wherein said controller uses said received speed signal from said speed sensor in controlling said throttle.

5. The throttle control system of claim 1, further comprising a brake system having a series of brakes associated with wheels of the vehicle.

6. The throttle control system of claim 5, wherein said brake system is an anti-lock brake system selectively supplying pulsations to said brakes at a predetermined duty cycle based on driving conditions.

7. The throttle control system of claim 6, wherein said duty cycle is supplied to said controller.

8. The throttle control system of claim 6, wherein said duty cycle is used by said controller in controlling said throttle.

9. The throttle control system of claim 1, further comprising a roll sensor in communication with said controller, said roll sensor configured to detect a tilt of the vehicle and provide a signal indicative of said detected tilt to said controller, said controller configured to control said throttle opening based on said tilt signal when said vehicle is determined to be operating in said first operating mode.

10. The throttle control system of claim 1, further comprising a position sensor associated with said selection switch, said position sensor providing said controller with said operating mode of a vehicle.

11. The throttle control system of claim 1, wherein said selection switch sets said operating mode of the vehicle based on an at least one of a manual input and a speed of a wheel of the vehicle.

12. The throttle control system of claim 11, further comprising a speed sensor sensing a speed of said wheel.

13. The throttle control system of claim 11, wherein said wheel is a non-driven wheel.

14. The throttle control system of claim 13, wherein said controller automatically sets said operating mode of said vehicle to said first operating mode when said controller determines via said speed sensor that said non-driven wheel is rotating at a lower rotational speed than a driven wheel.

15. The throttle control system of claim 9, wherein when said controller determines the vehicle is operating in said first operating mode, said controller then determines if said first and second operational data and said signal from said roll sensor are each beyond a predetermined threshold, and upon such determination, said controller controls said throttle opening to reduce said throttle opening to an amount less than proportional to said position of said accelerator based on said first operational data, said second operational data and said signal from said roll sensor.

* * * * *